United States Patent
Yaramada et al.

(10) Patent No.: US 11,249,819 B2
(45) Date of Patent: Feb. 15, 2022

(54) MIDDLEWARE FOR ENABLING INTEROPERATION BETWEEN A CHATBOT AND DIFFERENT COMPUTING SYSTEMS

(71) Applicant: Jade Global, Inc., San Jose, CA (US)

(72) Inventors: Karan Yaramada, San Jose, CA (US); Amit Iyer, Pune (IN); Adesh Patel, Pune (IN)

(73) Assignee: Jade Global, Inc., San Jose, CA (US)

( * ) Notice: Subject to any disclaimer, the term of this patent is extended or adjusted under 35 U.S.C. 154(b) by 249 days.

(21) Appl. No.: 15/977,732

(22) Filed: May 11, 2018

(65) Prior Publication Data

US 2019/0347142 A1     Nov. 14, 2019

(51) Int. Cl.
| | |
|---|---|
| *G06F 15/16* | (2006.01) |
| *G06F 9/54* | (2006.01) |
| *G06F 9/445* | (2018.01) |
| *G06F 9/451* | (2018.01) |
| *H04L 51/02* | (2022.01) |

(52) U.S. Cl.
CPC .......... *G06F 9/541* (2013.01); *G06F 9/44505* (2013.01); *G06F 9/453* (2018.02); *H04L 51/02* (2013.01)

(58) Field of Classification Search
CPC ...... G06F 9/541; G06F 9/453; G06F 9/44505; H04L 51/02
USPC .......................................................... 709/204
See application file for complete search history.

(56) References Cited

U.S. PATENT DOCUMENTS

| | | | | |
|---|---|---|---|---|
| 6,560,604 | B1* | 5/2003 | Fascenda | G06F 9/44505 707/999.01 |
| 2005/0198149 | A1* | 9/2005 | Johnson | H04L 29/06 709/206 |
| 2011/0282642 | A1* | 11/2011 | Kruger | G06F 11/3664 703/27 |
| 2015/0180736 | A1* | 6/2015 | Leung | H04L 41/5006 709/226 |
| 2018/0012021 | A1* | 1/2018 | Volkov | G06F 21/566 |
| 2018/0225381 | A1* | 8/2018 | Loganathan | G06F 16/9535 |
| 2018/0248817 | A1* | 8/2018 | Licht | H04L 51/02 |
| 2019/0050738 | A1* | 2/2019 | Sivagnanam | G06N 3/006 |

(Continued)

OTHER PUBLICATIONS

N. T. Thomas, "An e-business chatbot using AIML and LSA," 2016 International Conference on Advances in Computing, Communications and Informatics (ICACCI), 2016, pp. 2740-2742 (Year: 2016).*

(Continued)

*Primary Examiner* — Melvin H Pollack
*Assistant Examiner* — Messeret F Gebre
(74) *Attorney, Agent, or Firm* — Fountainhead Law Group P.C.

(57) ABSTRACT

Middleware for enabling interoperation between a chatbot application and a plurality of different systems are provided. According to one set of embodiments, a computer system implementing the middleware can receive a request from a user via the chatbot application and automatically determine, based on information included in the request, a system in the plurality of systems that the request is directed to and a service of the system that should be called for handling the request. The computer system can then invoke the service, receive a response from the system, and return the response to the chatbot application for presentation to the user.

14 Claims, 7 Drawing Sheets

(56) References Cited

U.S. PATENT DOCUMENTS

2019/0089798 A1* 3/2019 Driscoll .................. H04L 51/02
2019/0332451 A1* 10/2019 Tamjidi .................. G06F 9/547
2019/0370615 A1* 12/2019 Murphy .................. G06F 9/541

OTHER PUBLICATIONS

Hill, J., Ford, W. R., & Farreras, I. G. (2015). Real conversations with artificial intelligence: A comparison between human-human online conversations and human-chatbot conversations. Computers in Human Behavior, 49, 245-50 (Year: 2015).*

J. P. McIntire, L. K. McIntire and P. R. Havig, "Methods for chatbot detection in distributed text-based communications," 2010 International Symposium on Collaborative Technologies and Systems, 2010, pp. 463-472 (Year: 2010).*

* cited by examiner

MIDDLEWARE FOR ENABLING INTEROPERATION BETWEEN A CHATBOT AND DIFFERENT COMPUTING SYSTEMS

BACKGROUND

A "chatbot" is a software application that enables a user to communicate and interact with a computing system (e.g., a human resources system, a customer support system, a banking system, etc.) via an auditory or textual interface. For example, the user may submit, through the chatbot, a verbal or text-based request to take some action with respect the system (e.g., access the user's current account balance, cancel a submitted order, request vacation, etc.). In response, the chatbot (or a server component thereof) can parse the request, invoke an appropriate service of the system to handle the request, and return a response to the user.

One limitation with existing chatbot implementations, particularly in the enterprise context, is that they are generally designed to interoperate with a single type of system. For example, Oracle Corporation has a chatbot which can communicate only with Oracle Fusion-based systems. Similarly, SalesForce has a chatbot which can communicate only with SalesForce systems. As a result, an organization must deploy, and the organization's end-users must learn to use, multiple different chatbots if the organization employs multiple different enterprise systems (e.g., an Oracle system for enterprise resource planning (ERP) and human resources (HR), a SalesForce system for customer relationship management (CRM), etc.). This undesirably increases the costs and complexity of the organization's information technology infrastructure.

SUMMARY

Middleware for enabling interoperation between a chatbot application and a plurality of different systems are provided. According to one set of embodiments, a computer system implementing the middleware can receive a request from a user via the chatbot application and automatically determine, based on information included in the request, a system in the plurality of systems that the request is directed to and a service of the system that should be called for handling the request. The computer system can then invoke the service, receive a response from the system, and return the response to the chatbot application for presentation to the user.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to middleware for connecting a single chatbot application to multiple different computing systems, thereby enabling interoperation between the single chatbot application and those multiple systems. For example, at a high level, the middleware can receive a user request that is submitted via the chatbot application and automatically determine, by examining information included in the request, (1) which of the multiple computing systems the request is directed to and (2) which service (or services) of the system should be invoked to handle it. This determination can be based in part on configuration data that is setup by an administrator.

The middleware can then invoke the identified service(s) of the identified system with input parameters derived from the user request, receive a response from the system, and reformat/customize the response if needed. Like the determination step above, this reformatting/customization can be based on configuration data setup by the administrator. Finally, the middleware can forward the reformatted/customized response to the chatbot application for presentation to the requesting user.

With the general approach above, the middleware can allow the single chatbot application to seamlessly communicate and interact with a multitude of different computing systems, which is particularly useful for organizations that may make use of many disparate backend enterprise systems/platforms (e.g., an ERP system from one software vendor, a CRM system from another software vendor, an HR system from yet another software vendor, etc.). The foregoing and other aspects of the present disclosure are described in further detail in the sections that follow.

2. System Environment

Figure 1A:
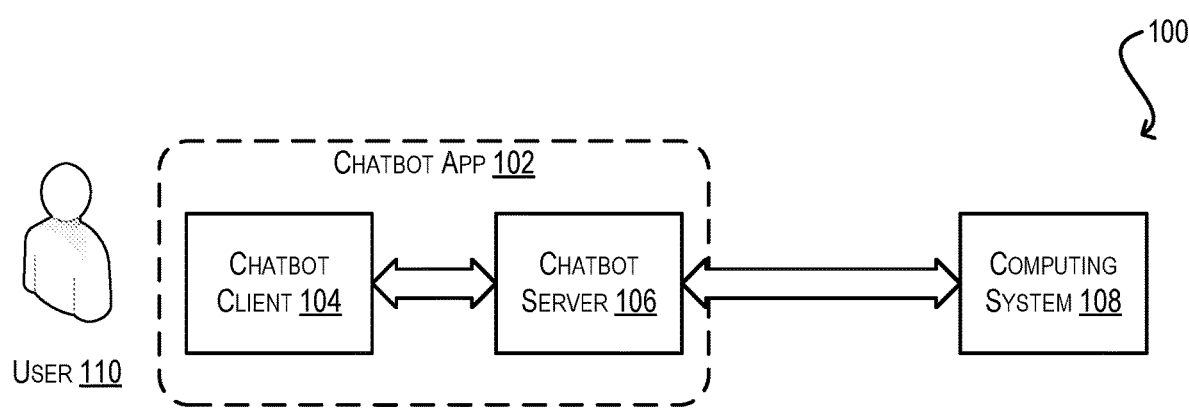
FIG. 1A depicts a conventional system environment comprising a chatbot application and a single computing system.

To provide context for the embodiments described herein, FIG. 1A depicts a conventional system environment 100 that includes a chatbot application 102 (comprising a chatbot client 104 and a chatbot server 106) connected to an enterprise computing system 108. Chatbot client 104, which may run on an end-user device such as a desktop computer, laptop computer, smartphone, tablet, etc., is operated by a user 110. Although only a single chatbot client is shown for ease of explanation, it should be appreciated that chatbot application 102 may support multiple concurrent clients (each operated by a different user).

In practice, user 110 can submit, via chatbot client 104, a request to take some action with respect to, or acquire information from, enterprise computing system 108. For example, if system 108 is an HR system, user 110 may submit a request for taking a number of vacation days. The particular modality of this request may be verbal or text-based and will depend on the type of user interface exposed by chatbot client 104.

Upon receiving the request, chatbot client 104 can forward it to chatbot server 106, which in turn can invoke an appropriate service (e.g., application programming interface (API)) exposed by enterprise computing system 108. System 108 can then process the request and generate a response (e.g., vacation request accepted or denied), which can be communicated back to chatbot client 104 via chatbot server 106 and presented to user 110.

As noted in the Background section, one issue with conventional chatbot implementations such as the one shown in FIG. 1A is that they are generally designed to interoperate with only a single type of computing system/platform (e.g., enterprise computing system 108). For organizations that implement multiple backend enterprise systems/platforms, this means that those organizations must deploy multiple chatbots in order to provide self-service chatbot access to those various systems/platforms, which can be costly and burdensome.

Figure 1B:
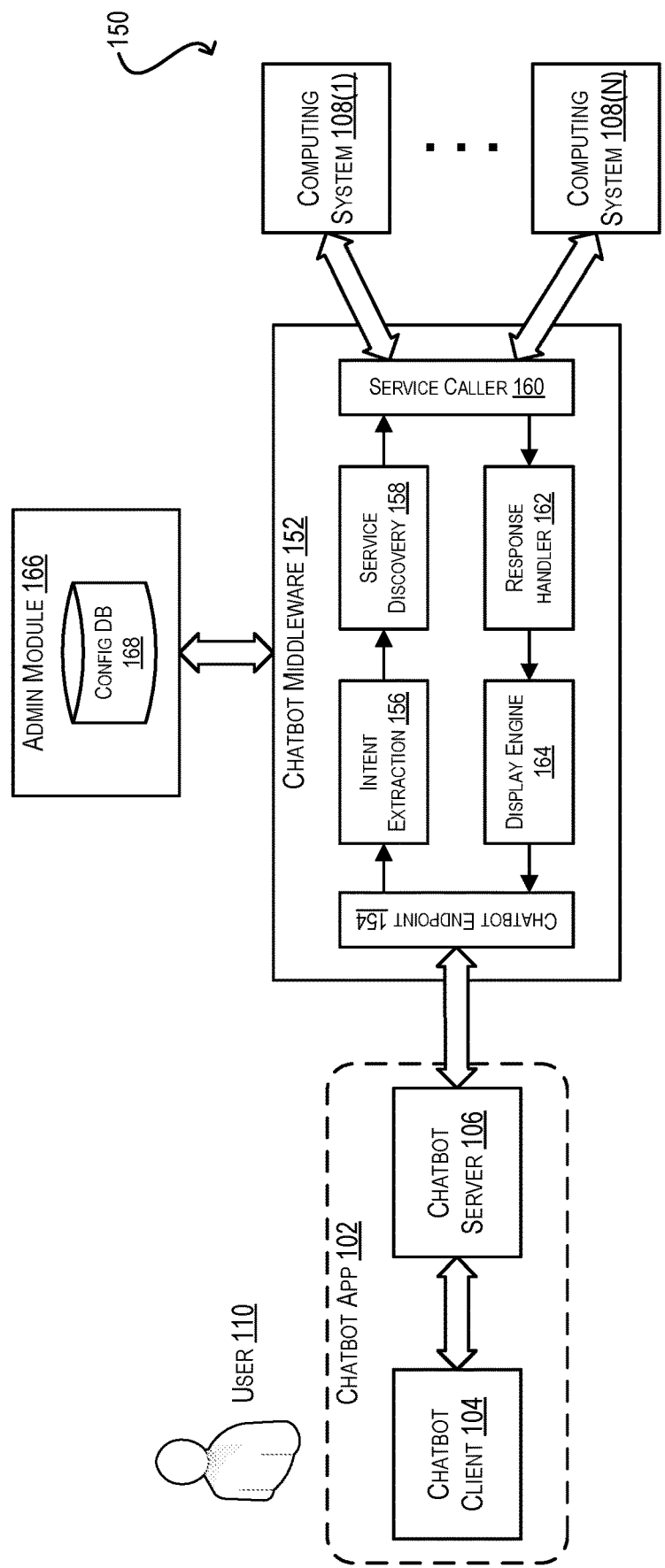
FIG. 1B depicts a system environment comprising a chatbot application that is connected to multiple different computing systems via chatbot middleware according to an embodiment.

To address the foregoing and other similar issues, FIG. 1B depicts a modified version of system environment 100 (i.e., system environment 150) that includes a novel chatbot middleware 152. As shown in FIG. 1B, chatbot middleware 152 comprises a number of sub-components (e.g., chatbot endpoint 154, intent extraction component 156, service discovery component 158, service caller 160, response handler 162, display engine 164) and is connected to chatbot server 106 on one end and to multiple different computing systems 108(1)-(N) on the other end. Each computing system 108(1)-(N) may be a different type of system provided by a different software vendor. In addition, chatbot middleware 152 is coupled to an admin module 166 comprising a configuration database 168.

As described in further detail below, chatbot middleware 152 can generally (1) receive a user request from chatbot client 104 (via chatbot server 106) to take an action with respect to one of computing systems 108(1)-(N); (2) automatically determine, based on the content (i.e., "intent") of the request, exactly which system 108(1)-(N) and which service (or services) of that system should be called to handle the request; (3) invoke the determined system/service(s); (4) receive a response; (5) reformat/customize the response in accordance with, e.g., configuration data defined in configuration database 168; and (6) forward the reformatted/customized response to chatbot server 106 for presentation to user 110 via chatbot client 104. In this way, chatbot middleware 152 can enable seamless interoperation between chatbot application 102 and computing systems 108(1)-(N) and thereby avoid the need to implement multiple distinct chatbots to provide access to systems 108(1)-(N).

In certain embodiments, chatbot middleware 152 can be configured to interoperate with any computing system or platform that supports a standardized communication interface/protocol such as REST (Representational State Transfer) or SOAP (Simple Object Access Protocol). Further, chatbot middleware 152 can be configured to provide additional functionalities beyond those described above, such as user authentication and authorization, request/response validation, request/response encryption and decryption, and so on.

It should be appreciated that system environment 150 of FIG. 1B is illustrative and not intended to limit embodiments of the present disclosure. For example, the various entities shown in this figure may be organized according to different configurations or arrangements and/or may include sub-components or functions that are not specifically described. One of ordinary skill in the art will recognize other variations, modifications, and alternatives.

3. High-Level Request Processing Workflow

Figure 2:
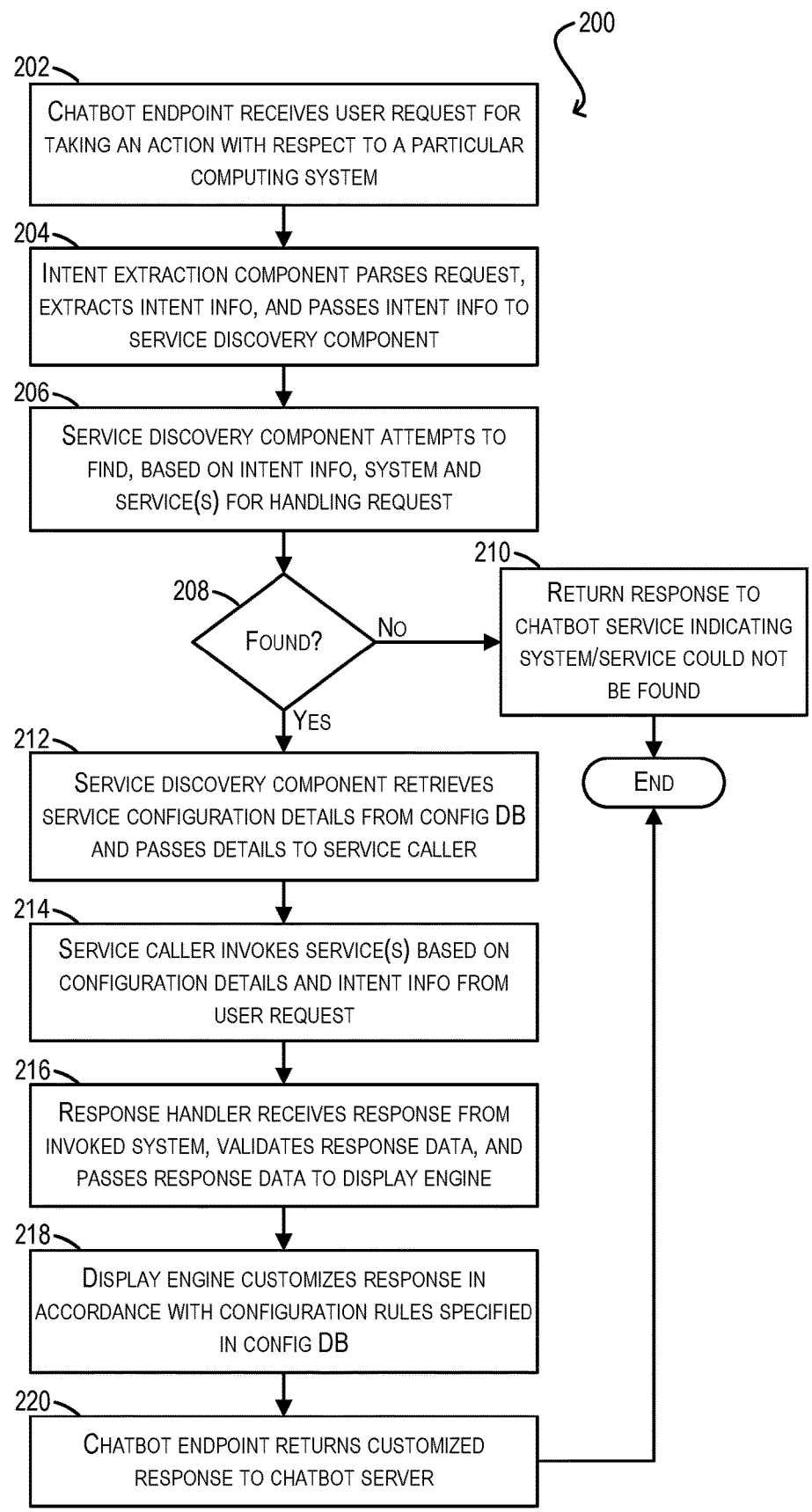
FIG. 2 a high-level request processing workflow that may be performed by the chatbot middleware of FIG. 1B according to an embodiment.

FIG. 2 depicts a flowchart 200 of the high-level request processing workflow that may be executed by chatbot middleware 152 of FIG. 1B and its constituent components according to an embodiment.

Starting with block 202, chatbot endpoint 154 of middleware 152 can receive, from chatbot server 106, a request originated by user 110 and submitted via chatbot client 104 for taking an action with respect to a particular computing system 108(1)-(N). This request can include content, referred to as "intent information," that specifies the objective/purpose of the user's request. For example, in one set of embodiments, the intent information can comprise the action to be performed (e.g., access, create, update, delete), an object on which the action is to be performed, and entity information that may be used to determine, among other things, the system to which the request pertains. The request may be submitted verbally or as text, depending on the type of user interface exposed by chatbot client 104 to user 110.

The following listings are two example formats for the intent information included in the request (the first is an "update" action and the second is a "get," or access, action). These listings are provided for illustrative purposes only and various modifications to these formats are possible.

| Listing 1 |
|---|
| "INTENT"--------------------------I<br>{<br>  "ACTION": "UPDATE",<br>"ENTITIES": [<br>    {"NAME": "ID", "VALUE": "0067F000004eK5pQAE"},<br>    {"NAME": "Name", "VALUE": "Adish"},<br>    {"NAME": "Amount", "VALUE": "290000"}<br>  ],<br>  "OBJECT": "OPPORTUNITY"<br>} |

| Listing 2 |
|---|
| "INTENT"--------------------------I<br>{<br>  "ACTION": "GET",<br>"ENTITIES": [<br>    {"NAME": "ID", "VALUE": "0067F000004eK5pQAE"},<br>    {"NAME": "Name", "VALUE": "Adish"},<br>    {"NAME": "Amount", "VALUE": "290000"}<br>  ],  "OBJECT": "OPPORTUNITY"<br>} |

At block 204, intent extraction component 156 can parse the request, extract the intent information, and pass the intent information to service discovery component 158. In response, service discovery component 158 can attempt to determine (i.e., discover), based on the intent information, which computing system 108(1)-(N) and which system service (or services) should be called to handle the request (block 206). As part of block 206, service discovery component 158 can access configuration database 168 of admin module 166, which is assumed to be populated (by, e.g., an administrator) with entries linking intent fields (e.g., action, object, entities) with particular systems and services. This discovery process is described in further detail with respect to FIG. 3 below.

If, at block 208, service discovery component 158 is unable to find a system and service to handle the request, chatbot middleware 152 can return a response to chatbot server 106 indicating that there is no appropriate system/service (block 210) and flowchart 200 can end.

However, if service discovery component 158 is able to find a system and service to handle the request (e.g., service A of system 108(X)), service discovery component 158 can retrieve details for invoking the service from configuration database 168 and pass this information to service caller 160 (block 212). Service caller 160 can then invoke the service based on the service information received from service discovery component 158 and the intent information of the user request (block 214).

At block 216, response handler 162 of chatbot middleware 152 can receive a response from system 108(X) upon completion of service execution and validate the response contents. For example, although not explicitly shown, if the response indicates an error status, this error status can be directly returned to chatbot server 106.

Assuming the response is valid, response handler 162 can forward the response to display engine 164, which can customize and reformat the response in accordance with any administrator-defined configuration rules specified in configuration database 168 (block 218). For example, configuration database 168 may include a configuration rule indicating that all responses generated by a given system 108(Y) should be converted into a display format F1. Alternatively or in addition, configuration database 168 may include a configuration rule indicating that all responses destined for a given type of chatbot client 104 should be converted into a display format F2.

Finally, at block 220, chatbot endpoint 152 can return the reformatted/customized response to chatbot server 106, which in turn can forward it to chatbot client 104 for presentation to user 110 and flowchart 200 can end.

4. Service Discovery Workflow

Figure 3:
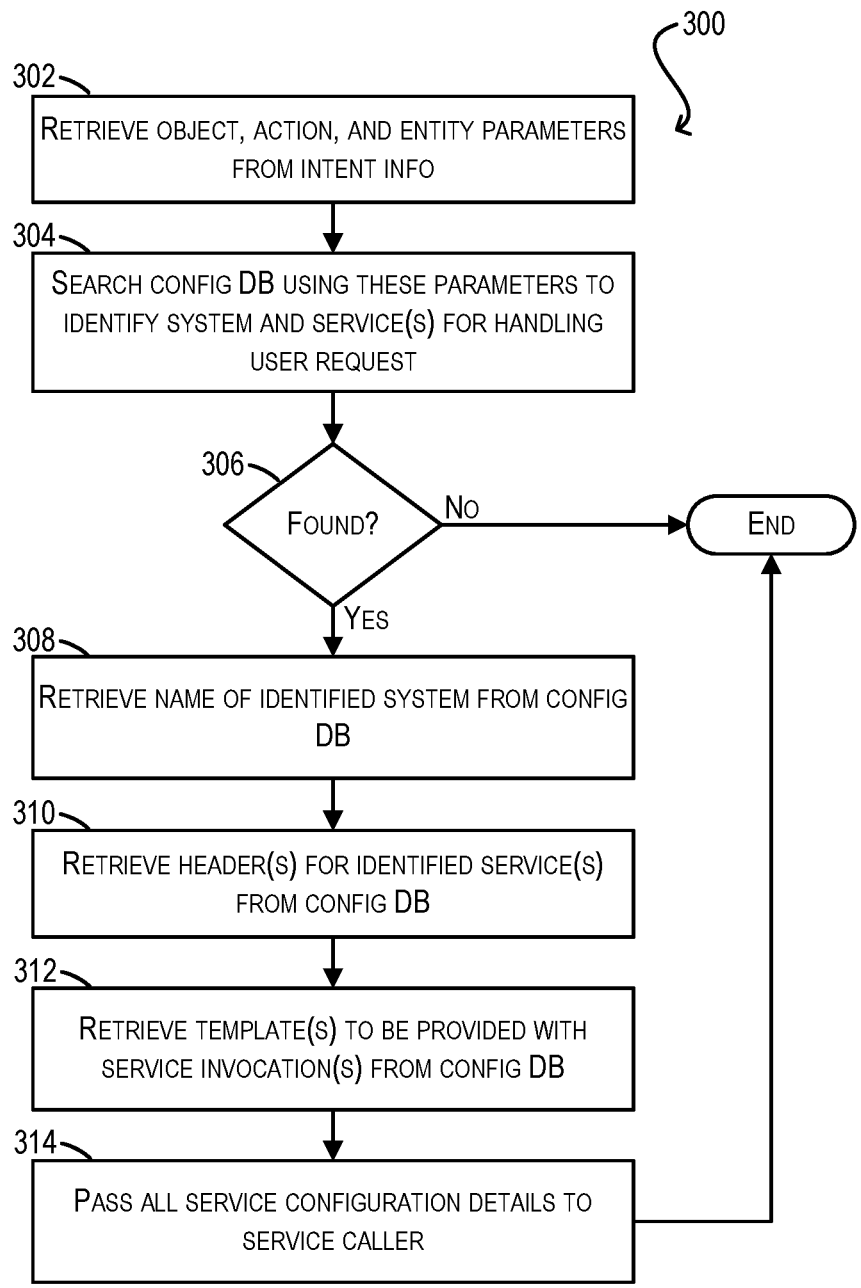
FIG. 3 depicts a service discovery workflow that may be performed by the chatbot middleware of FIG. 1B according to an embodiment.

FIG. 3 depicts a flowchart 300 that provides additional details regarding the processing that may be performed by service discovery component 158 in discovering a system/service for an incoming user request (per blocks 206-212 of flowchart 200) according to an embodiment.

At blocks 302 and 304, service discovery component 158 can first retrieve the object, action, and entity parameters from the intent information passed by intent extraction component 156 and search configuration database 168 using these parameters to identify an appropriate system and service for handing the request. If no matching system and service is found in database 168 (block 306), the flowchart can end.

Otherwise, service discovery component 158 can retrieve, from configuration database 168, the configuration details of the discovered system and service(s). These details can include the name of the identified system (block 308), header(s) for invoking the identified service(s) (block 310), and template(s) for any data payload(s) to be provided with the service invocation(s) (block 312). Once these details are retrieved, service discovery component 158 can pass them to service caller 160 (block 314) and flowchart 300 can end.

5. Service Call Workflow

Figure 4:
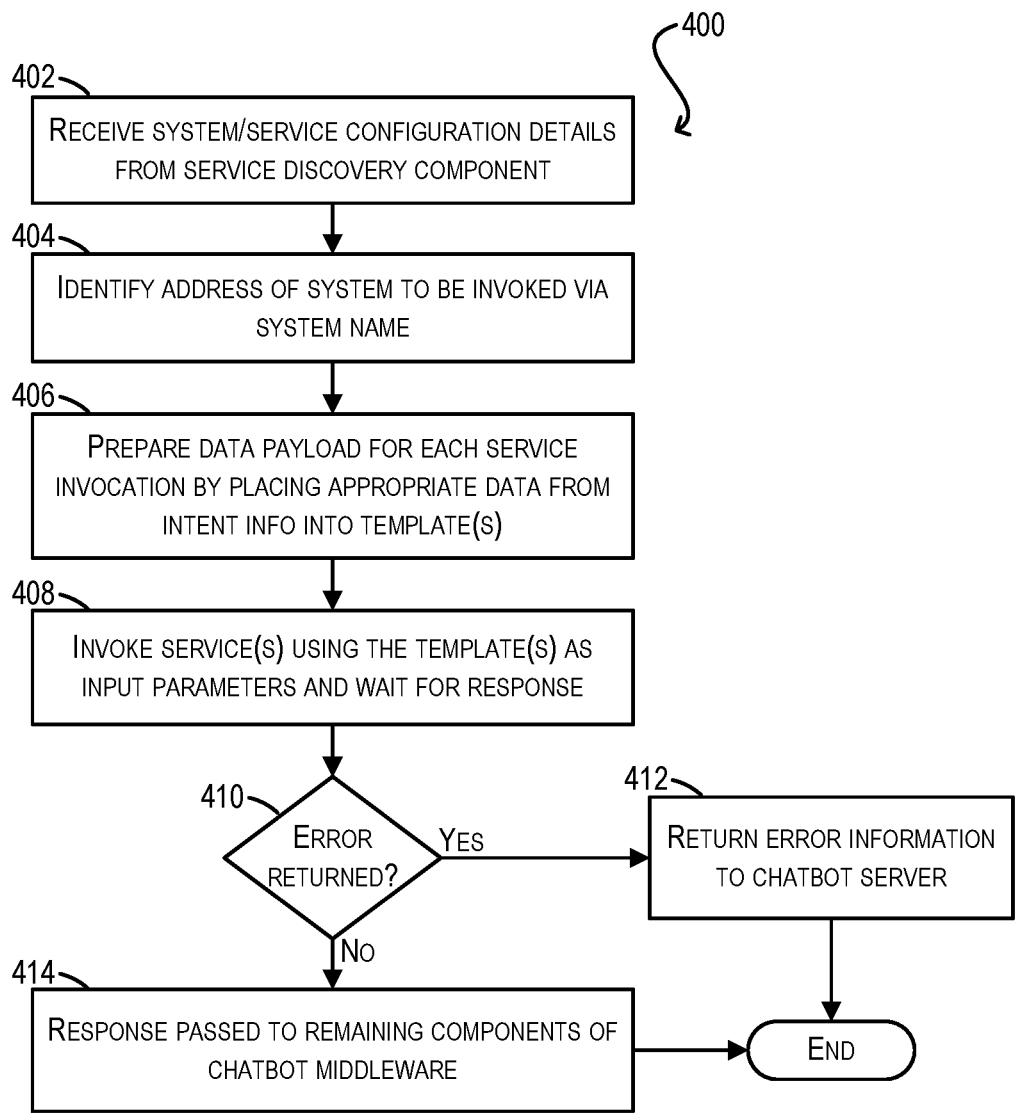
FIG. 4 depicts a service call workflow that may be performed by the chatbot middleware of FIG. 1B according to an embodiment.

FIG. 4 depicts a flowchart 400 that provides additional details regarding the processing that may be performed by service caller 160 for invoking a service based on the system and service configuration details provided by service discovery component 160 (per block 212 of flowchart 200 and block 314 of flowchart 300) according to an embodiment.

Starting with block 402, service caller 160 can receive the system/service configuration details from service discovery component 160. As mentioned previously, these details can include the name of the system, the header(s) of the system service(s) to be invoked, and template(s) of data payload(s) to be included with the service invocation(s).

At block 404, service caller 160 can identify the address of the appropriate computing system 108(1)-(N) to be called via the system name. Further, at block 406, service caller 160 can prepare the data payload for each service invocation by placing appropriate data from the intent information of the user request into the templates provided by service discovery component 160.

Once the template(s) are prepared, service caller 160 can invoke the system service(s) using the template(s) as input parameter(s) and wait for a response (block 408). If the system returns an error (block 410), the error status/error message can be obtained and this error information can be sent back to the chatbot application (block 412). Otherwise, the service response can be passed to the remaining pipeline components of chatbot middleware 152 (block 414) and flowchart 400 can end.

6. Display Customization Workflow

Figure 5:
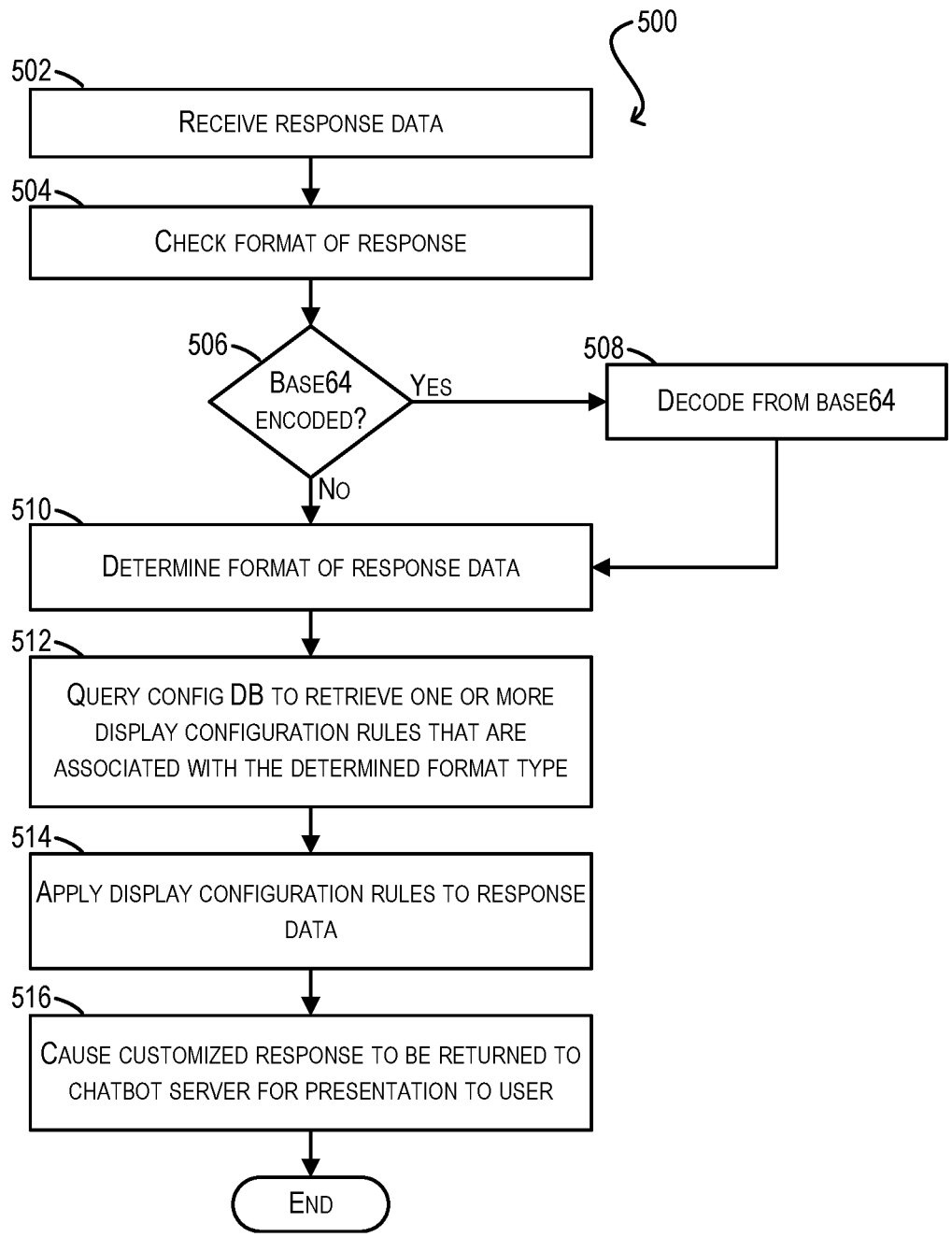
FIG. 5 depicts a display customization workflow that may be performed by the chatbot middleware of FIG. 1B according to an embodiment.

FIG. 5 depicts a flowchart 500 that provides additional details regarding the processing that may be performed by display engine 164 for reformatting/customizing a service response (per block 218 of flowchart 200) according to an embodiment. This is useful because each computing system 108(1)-(N) may behave differently in terms of the way in which it formats its responses. For example, an Oracle system may return responses in an encrypted XML (Extensible Markup Language) format, while a SalesForce system may return responses in a plan JSON (JavaScript Object Notation) format. With display engine 164, chatbot middleware 152 can ensure that all chatbot responses are presented to end-users in a consistent manner, regardless of the system from which they originated.

Further, there may be scenarios where a particular customer would like to implement certain customizations with respect to the response data, such as limiting the number of records returned, changing the header or response data, showing/hiding specific data, adding aliases to the data, and so on. Display engine 164 makes these customizations possible.

Starting with blocks 502 and 504 of FIG. 5, display engine 164 can receive the response data and check the format of the response. If the response is base64 encoded (block 506), display engine 164 can decode from base64 (block 508). Display engine 164 can then determine the format type of the response data (e.g., HTML, XML, JSON, etc.) (block 510).

Based on the format type determined at block 510, display engine 164 can query configuration database 168 to retrieve one or more display configuration rules in database 168 that are associated with that format type (block 512). As mentioned previously, such display configuration rules may convert the data into a different format, change the response header, show or hide specific data, etc. These display configuration rules may be pre-defined by an administrator of chatbot middleware 152.

Finally at blocks 514 and 516, display engine 164 can apply the display configuration rules to the response data (thereby reformatting/customizing the response), and cause the reformatted/customized response to be returned to chatbot server 106 for presentation to user 110.

7. Example Computer System

Figure 6:
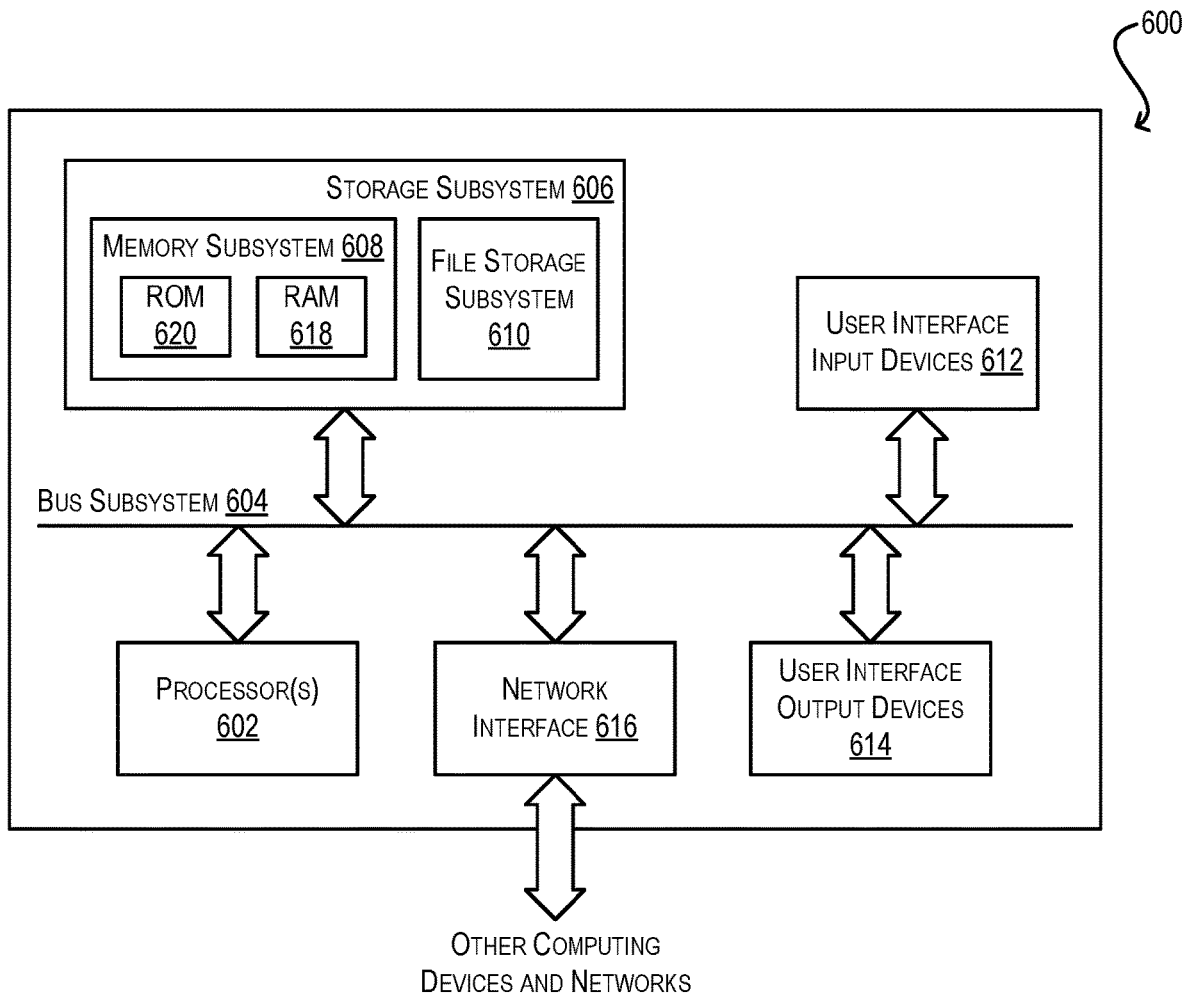
FIG. 6 depicts an example computer system according to an embodiment.

FIG. 6 is a simplified block diagram of an example computer system 600 according to an embodiment. Computer system 600 can be used to execute chatbot middleware 152 of FIG. 1B. As shown in FIG. 6, computer system 600 can include one or more processors 602 that communicate with a number of peripheral devices via a bus subsystem 604. These peripheral devices can include a storage subsystem 606 (comprising a memory subsystem 608 and a file storage subsystem 610), user interface input devices 612, user interface output devices 614, and a network interface subsystem 616.

Bus subsystem 604 can provide a mechanism for letting the various components and subsystems of computer system 600 communicate with each other as intended. Although bus subsystem 604 is shown schematically as a single bus, alternative embodiments of the bus subsystem can utilize multiple buses.

Network interface subsystem 616 can serve as an interface for communicating data between computer system 600 and other computing devices or networks. Embodiments of network interface subsystem 616 can include wired (e.g., coaxial, twisted pair, or fiber optic Ethernet) and/or wireless (e.g., Wi-Fi, cellular, Bluetooth, etc.) interfaces.

User interface input devices 612 can include a keyboard, pointing devices (e.g., mouse, trackball, touchpad, etc.), a scanner, a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 600.

User interface output devices 614 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 600.

Storage subsystem 606 can include a memory subsystem 608 and a file/disk storage subsystem 610. Subsystems 608 and 610 represent non-transitory computer-readable storage media that can store program code and/or data that provide the functionality of various embodiments described herein.

Memory subsystem 608 can include a number of memories including a main random access memory (RAM) 618 for storage of instructions and data during program execution and a read-only memory (ROM) 620 in which fixed instructions are stored. File storage subsystem 610 can provide persistent (i.e., non-volatile) storage for program and data files and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 600 is illustrative and not intended to limit embodiments of the present disclosure. Many other configurations having more or fewer components than computer system 600 are possible.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A method comprising:
    receiving, by a chatbot middleware component, a request from a user in an organization, the request being submitted by the user via a chatbot client communicatively coupled with a chatbot application;
    automatically determining, by the chatbot middleware component based on information included in the request, an enterprise computing system in a plurality of enterprise computing systems that the request is directed to and a service of the enterprise computing system that should be called for handling the request, wherein the plurality of enterprise computing systems are implemented by the organization for use by the organization's users, and wherein the automatically determining comprises:
        extracting, from the request, an action parameter, an object parameter, and one or more entity parameters, wherein the action parameter identifies a data update action or a data access action to be executed for the request, wherein the object parameter identifies an object to which the data update action or the data access action applies, and wherein the one or more entity parameters identify one or more attributes of the object to be updated or accessed via the data update action or the data access action;
        matching the action parameter, the object parameter, and the one or more entity parameters to a database entry in a configuration database, the database entry including a name of the enterprise computing system, a header for invoking the service of the enterprise computing system, and a template for a data payload to be provided as input to the service at a time of invoking the service;
        identifying, by the chatbot middleware component, an address of the enterprise computing system from the name included in the database entry; and
        populating, by the chatbot middleware component, data from the request into the template included in the database entry;
    invoking, by the chatbot middleware component, the service using the address and the header, the invoking including providing the populated template as an input parameter to the service;
    receiving, by the chatbot middleware component, a response from the invoked service;

customizing, by the chatbot middleware component, the response, the customizing comprising:
  determining a format type of the response;
  matching the format type to another database entry in the configuration database, said another database entry including one or more display configuration rules associated with the format type; and
  applying the one or more display configuration rules to the response; and
returning, by the chatbot middleware component, the customized response to the chatbot application for presentation to the user via the chatbot client.

2. The method of claim 1 wherein each enterprise computing system in the plurality of enterprise computing systems is provided by a different software vendor.

3. The method of claim 1 wherein the information included in the request comprises intent information indicating an objective or purpose of the request.

4. The method of claim 1 wherein the configuration database is setup by an administrator in the organization.

5. The method of claim 1 wherein if the action parameter, the object parameter, and the one or more entity parameters cannot be matched to any database entry in the configuration database, the method further comprises returning an error message to the chatbot application.

6. The method of claim 1 further comprising, upon receiving the response:
  validating the response; and
  if the response includes an error status, returning an error message to the chatbot application.

7. The method of claim 6 wherein the response is customized if the response does not include an error status.

8. The method of claim 1 wherein the one or more display configuration rules associated with the format type are defined by an administrator in the organization.

9. The method of claim 1 wherein the one or more display configuration rules include a first display configuration rule that converts the response into a different format, a second display configuration rule that shows or hides data in the response, and a third display configuration rule that adds one or more aliases to the data in the response.

10. The method of claim 9 wherein the one or more display configuration rules include a fourth display configuration rule that converts the response into a particular display format based on a type of the chatbot client.

11. The method of claim 9 wherein the one or more display configuration rules include a fourth display configuration rule that converts the response into a particular display format based on a type of the enterprise computing system.

12. The method of claim 1 wherein the customizing further comprises:
  determining whether the response is base64 is encoded; and
  if the response is base64 encoded, decoding the response from base64 prior to determining the format type of the response.

13. A non-transitory computer readable storage medium having stored thereon program code executable by a processor of a chatbot middleware component, the program code comprising:
  code that causes the processor to receive a request from a user in an organization, the request being submitted by the user via a chatbot client communicatively coupled with a chatbot application;
  code that causes the processor to determine, based on information included in the request, an enterprise computing system in a plurality of enterprise computing systems that the request is directed to and a service of the enterprise computing system that should be called for handling the request, the plurality of enterprise computing systems being implemented by the organization for use by the organization's users, the determining comprising
    extracting, from the request, an action parameter, an object parameter, and one or more entity parameters, wherein the action parameter identifies a data update action or a data access action to be executed for the request, wherein the object parameter identifies an object to which the data update action or the data access action applies, and wherein the one or more entity parameters identify one or more attributes of the object to be updated or accessed via the data update action or the data access action;
    matching the action parameter, the object parameter, and the one or more entity parameters to a database entry in a configuration database, the database entry including a name of the enterprise computing system, a header for invoking the service of the enterprise computing system, and a template for a data payload to be provided as input to the service at a time of invoking the service;
    identifying, by the chatbot middleware component, an address of the enterprise computing system from the name included in the database entry; and
    populating, by the chatbot middleware component, data from the request into the template included in the database entry;
  code that causes the processor to invoke the service using the address and the header, the invoking including providing the populated template as an input parameter to the service;
  code that causes the processor to receive a response from the invoked service;
  code that causes the processor to customize the response by:
    determining a format type of the response;
    matching the format type to another database entry in the configuration database, said another database entry including one or more display configuration rules associated with the format type; and
    applying the one or more display configuration rules to the response; and
  code that causes the processor to return the response to the chatbot application for presentation to the user via the chatbot client.

14. A computer system implementing a chatbot middleware component, the computer system comprising:
  a processor; and
  a non-transitory computer readable medium having stored thereon program code that, when executed by the processor, causes the processor to:
    receive a request from a user in an organization, the request being submitted by the user via a chatbot client communicatively coupled with a chatbot application;
    determine, based on information included in the request, an enterprise computing system in a plurality of enterprise computing systems that the request is directed to and a service of the enterprise computing system that should be called for handling the request, the plurality of enterprise computing systems being implemented by the organization for use by the organization's users, the determining comprising:

extracting, from the request, an action parameter, an object parameter, and one or more entity parameters, wherein the action parameter identifies a data update action or a data access action to be executed for the request, wherein the object parameter identifies an object to which the data update action or the data access action applies, and wherein the one or more entity parameters identify one or more attributes of the object to be updated or accessed via the data update action or the data access action;

matching the action parameter, the object parameter, and the one or more entity parameters to a database entry in a configuration database, the database entry including a name of the enterprise computing system, a header for invoking the service of the enterprise computing system, and a template for a data payload to be provided as input to the service at a time of invoking the service;

identifying, by the chatbot middleware component, an address of the enterprise computing system from the name included in the database entry; and populating, by the chatbot middleware component, data from the request into the template included in the database entry;

invoke the service using the address and the header, the invoking including providing the populated template as an input parameter to the service;

receive a response from the invoked service;

customize the response by:
    determining a format type of the response;
    matching the format type to another database entry in the configuration database, said another database entry including one or more display configuration rules associated with the format type; and
    applying the one or more display configuration rules to the response; and return the response to the chatbot application for presentation to the user via the chatbot client.

* * * * *